(12) United States Patent
Crevier

(10) Patent No.: US 6,336,314 B1
(45) Date of Patent: Jan. 8, 2002

(54) RAKE HAVING GRASPING FEATURES

(76) Inventor: Jocelyn Crevier, 2139 de Mexico, Laval, Quebec (CA), H7M 3C7

(*) Notice: Subject to any disclaimer, the term of this patent is extended or adjusted under 35 U.S.C. 154(b) by 0 days.

(21) Appl. No.: 09/583,567

(22) Filed: May 31, 2000

Related U.S. Application Data

(60) Provisional application No. 60/136,843, filed on Jun. 1, 1999.

(51) Int. Cl.[7] .................................................. A01D 7/10
(52) U.S. Cl. .................................... 56/400.12; 294/50.8
(58) Field of Search ........................ 56/400.01, 400.04, 56/400.12, 400.16, 400.17, 400.18, 400.19, 400.2, 400.06; 294/19.1, 50.9, 50.7, 50.8

(56) References Cited

U.S. PATENT DOCUMENTS

| | | | |
|---|---|---|---|
| 3,601,966 A | * 8/1971 | Kerry | 56/400.12 |
| 4,185,448 A | * 1/1980 | Blanco | 56/400.12 |
| 4,378,671 A | * 4/1983 | Gascon | 56/400.12 |
| 4,545,189 A | * 10/1985 | Nelson | 56/400.12 |
| RE33,702 E | * 10/1991 | Allen | 56/400.12 |
| 5,303,536 A | * 4/1994 | Tolliver | 56/400.12 |
| 6,134,869 A | * 10/2000 | Barrett | 56/400.12 |

* cited by examiner

*Primary Examiner*—Robert E. Pezzuto

(57) ABSTRACT

A rake having grasping features, the rake including and elongated and tubular rake handle. A main rake head is attached to the handle and an auxiliary rake head is pivotally attached to the main rake head by an auxiliary head hinge. The auxiliary head hinge allows the auxiliary rake head to pivot relative to the main rake head between an opened and a clamping configuration in a jaw like manner. A actuating sleeve is slidably mounted on the rake handle and an actuating rod is pivotally attached between the actuating sleeve and the auxiliary rake head. Biasing sleeve is mounted on the rake handle between the actuating sleeve and the main rake head. Slidable movement of the actuating sleeve towards the main rake head resiliently compresses the biasing sleeve. When in a compressed state, the biasing sleeve have an inherent tendency to resiliently spring back towards its uncompressed state, biases the actuating sleeves away from the main head and, through the mechanical link created by the actuating rod, biases the auxiliary rake head towards the open configuration.

14 Claims, 2 Drawing Sheets

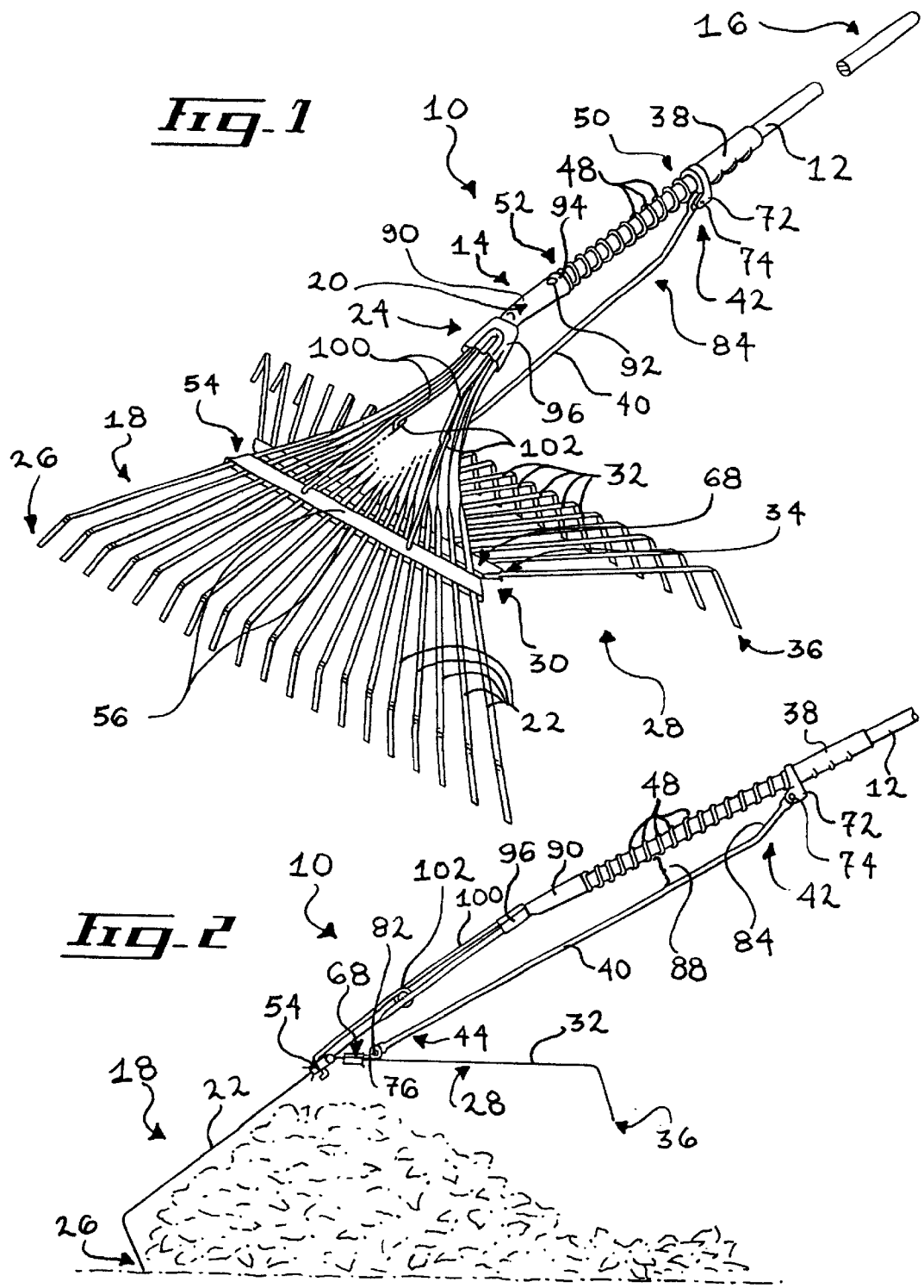

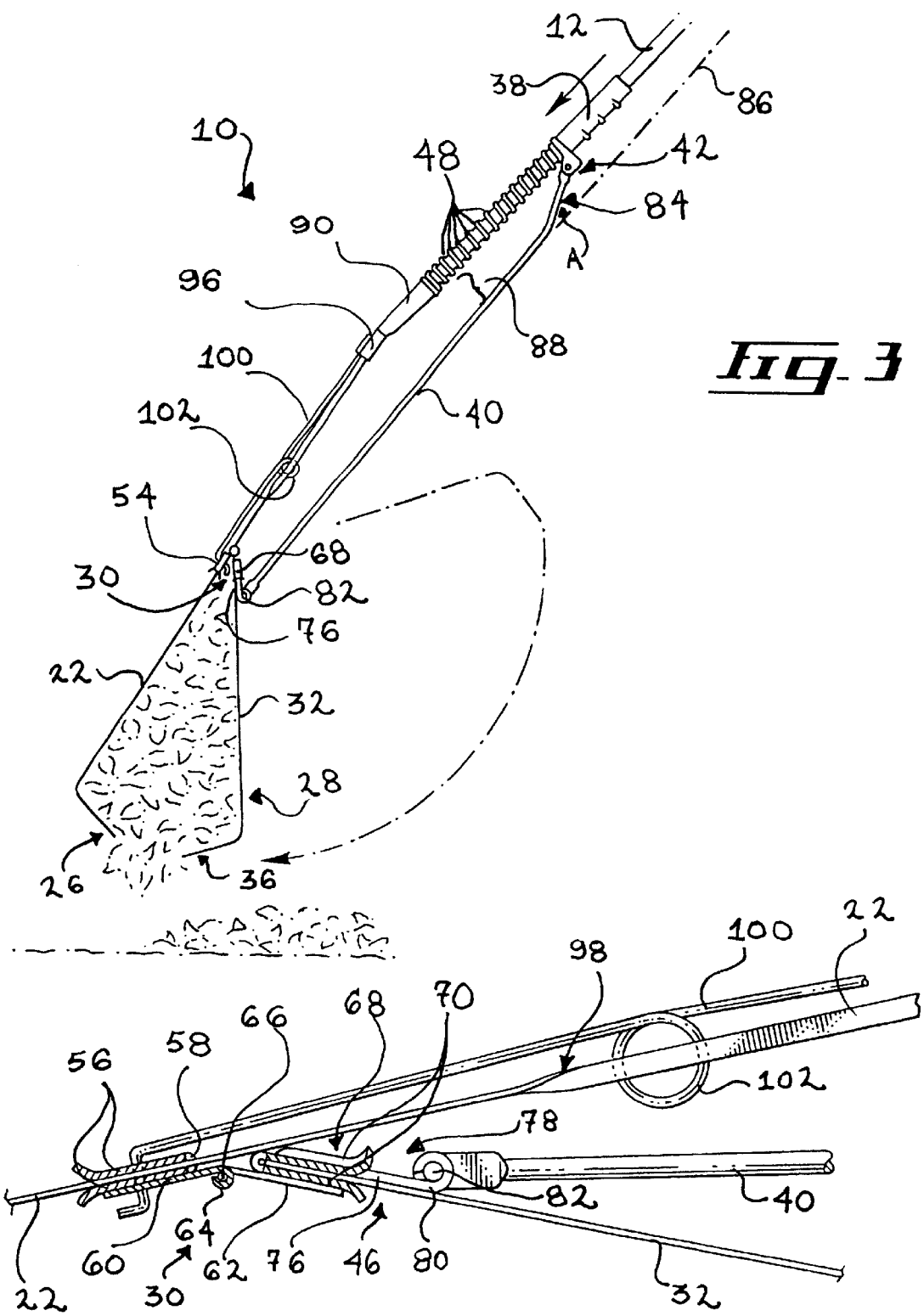

RAKE HAVING GRASPING FEATURES

This application is a continuation in part of provisional application serial No. 60/136,843, filed Jun. 1, 1999.

FIELD OF THE INVENTION

The present invention relates to the field of lawn tools and is particularly concerned with a rake having grasping features and an adaptor for transforming a conventional rake into a rake having grasping features.

BACKGROUND OF THE INVENTION:

The use of rakes having fanned times for light raking such as raking together grass cuttings, tree leaves or the like is well known. Indeed, conventional rakes are commonly used to sweep leaves, grass cuttings and other materials into a pile. The pile is then picked up and placed within bags or other containers for disposal.

The task of picking up the piles and placing them within the disposal container has proven to be quite unergonomical and burdensome, particularly in view of the repeated bending and lifting movements. In picking up the raked piles the rake head is commonly used together with the hand of the user as a scoop against which portions of the pile to be disposed of or picked up for disposal is pressed. Not only is the operation unergonomical but also inefficient since only small amounts of trash can be held against the rake head in each pick up operation.

The need for an ergonomnical and efficient tool combining raking and grasping features has been recognized in the past. For example, U.S. Pat. No. 4,848,074 naming Lewis E. Allen as inventor and issued Jul. 18, 1989 discloses a rake like device provided for grasping and lifting a pile of material. The device includes a hollow handle having a rake head attached to its lower most extremity. The rake head is provided with a circular array of flexible metal times. A cable is disposed within the handle and extends a loop configuration to engagement with eyes associated with the times. When the cable is pulled upwardly, the times move radially in unison in an inwardly converging manner. When the pulling force is removed, the times return to their outwardly disposed positions.

U.S. Pat. No. 4,185,448 naming Francisco Blanco as inventor and issued Jan. 29, 1980 discloses a rake having a fanned spring finger main raking head fixed at one end of the rake handle. The rake is further provided with an auxiliary complimentary fanned spring finger rake head pivotally supported with respect to the rake handle and movable into clamping jaw like relation with respect to the main raking head for picking up raked trash piles. The individual spring fingers of one rake head recedes between the spring fingers of the other rake head to provide for raking with either rake head when they are held in a relatively clamped together position.

U.S. Pat. No. 4,018,038 naming Charles B. Sepe as inventor discloses a hand rake having grasping times. The rake includes a pair of multi timed fork members and a frame assembly for pivotally holding the fork members in a spaced facing relationship. A handle assembly secured to the frame assembly for carrying the fork member and a control mechanism is provided for cooperatively varying the pivotal dispositions of the fork members from an open material raking condition to a closed material transporting condition.

Although these prior art devices include both raking and grasping features, they suffer from major drawbacks including overall mechanical complexity leading to a high production cost and relatively low reliability. They also suffer from being both relatively unergonomical and inefficient. Accordingly, there exists a need for an improved rake having grasping features and for an adaptor allowing the conversion of a conventional rake into a rake having grasping features.

Advantages of the present invention include the fact that the proposed raking device has built-in integral grasping means allowing both raking of objects such as leaves, grass cuttings and the like into piles as well as grasping and picking up comparatively large piles of trash without bending and with minimal effort. The proposed device provides a relatively large capacity with minimal weight added to the conventional rake. The proposed device is specifically designed so as to be both ergonomnical and efficient.

Another main feature of the present invention resides in that the hereinabove mentioned advantages may be accomplished using a relatively simple mechanical structure thus reducing overall production cost and increasing overall reliability. Further advantages include the fact that the proposed device provides a double set of times that improves the overall ergonomic efficiency of every raking stroke.

Furthermore, the proposed device allows an intended user to pick-up raked components through an ergonomic set of steps and in a continuous motion with the raking stroke. This, in turn, reduces the risk of having the raked articles blown away or otherwise dispersed in certain environments, such as high winds or the like.

The proposed device is further specifically designed so as to be made of components that can easily be retro-fitted and affixed to existing rakes without requiring special tooling or manual dexterity.

SUMMARY OF THE INVENTION

In accordance with the present invention, there is provided a rake having grasping features comprising, in combination: an elongated and tubular rake handle, the rake handle defining a handle first longitudinal end and an opposed handle second longitudinal end; a main rake head attached to the rake handle adjacent the handle first longitudinal end by a main head base component, the main rake head including a set of main times extending from the main head base component, each of the main times defining a corresponding main tine proximal end and a main tine distal end; an auxiliary rake head pivotally attached to the main rake head by an auxiliary head hinge means, the auxiliary rake head including a set of auxiliary times extending from the auxiliary head hinge means, each of the auxiliary times defining a corresponding auxiliary tine proximal end and an opposed auxiliary tine distal end; the auxiliary head hinge means allowing the auxiliary rake head to pivot relative to the main rake head between an open configuration and a clamping configuration in a jaw-like manner, the auxiliary head hinge means being positioned intermediate the main tine proximal ends and the main tine distal ends and the auxiliary times being sized such that when the auxiliary head is in the clamping configuration the auxiliary tine distal ends are in a proximal relationship with the main tine distal ends; an actuating means for allowing an intended user to move the auxiliary rake head between the open and clamping configurations, the actuating means including an actuating sleeve slidably mounted on the rake handle and an actuating rod, the actuating sleeve defining a sleeve longitudinal axis, the actuating rod defining an actuating rod first longitudinal end, an actuating rod second longitudinal end and an actuating rod longitudinal axis, the actuating rod first longitudinal end being pivotally attached to the actuating sleeve and the actuating rod second longitudinal end being pivotally attached to the auxiliary head by an actuating rod-to-auxiliary head attachment means; a biasing means for biasing the auxiliary rake head towards the open configuration, the biasing means including a resiliently deformable biasing sleeve mounted on the rake handle, the biasing sleeve defining a biasing sleeve first longitudinal end and a biasing sleeve second longitudinal end, the biasing sleeve being sized such that when the auxiliary rake head is moved towards the clamping configuration the biasing sleeve first longitudinal end abuttingly contacts the actuating sleeve and the biasing sleeve second longitudinal end abuttingly contacts the main head base component; whereby slidable movement of the actuating sleeve towards the main head base component resiliently compresses the biasing sleeve, when in a compressed state the biasing sleeve having an inherent tendency to resiliently spring back towards its uncompressed state biases the actuating sleeve away from the main head base component and, through the mechanical link created by the actuating rod, biases the auxiliary rake head towards the open configuration. Preferably, the biasing sleeve includes an helicoidal-type spring, the helicoidal-type spring being coiled around the rake handle.

Conveniently, a main stabilizing structure extends transversally across the main times intermediate the main tine proximal and distal ends, the main stabilizing structure including a pair of main stabilizing plates, a stabilized segment of the main times being sandwiched between the main stabilizing plates; the auxiliary hinge means includes a first hinge plate and a second hinge plate positioned transversally relative to the main and auxiliary rake heads, the first and second hinge plates each having a corresponding set of spaced apart first and second hinge plate eyelets extending from one of their respective peripheral edges, the first and second hinge plate eyelets being positioned in side by side relationship relative to each other so as to define a common eyelet channel, an hinge rod extending through the eyelet channel to pivotally join together the first and second hinge plates; the first hinge plate being attached to one of the stabilizing plates and the second hinge plate being attached to the auxiliary times by an auxiliary tine attachment component.

Preferably, the auxiliary tine attachment component extends transversally across the auxiliary times adjacent the auxiliary tine proximal ends, the auxiliary tine attachment component including a pair of auxiliary attachment plates, an attached segment of the auxiliary times being sandwiched between the auxiliary attachment plates.

Conveniently, the actuating sleeve includes a rod-to-sleeve attachment section, the rod-to-sleeve attachment section including a sleeve spacing segment extending radially away from the actuating sleeve in a generally perpendicular relationship relative to the sleeve longitudinal axis, the rod first longitudinal end being pivotally attached to the sleeve spacing segment by a rod first hinge pin.

Preferably, the actuating rod-to-auxiliary head attachment means includes an actuating rod-to-auxiliary head attachment component, the actuating rod-to-auxiliary head attachment component defining a rod spacing segment extending away from the auxiliary attachment plates and in a direction generally parallel to the auxiliary times, the actuating rod-to-auxiliary head attachment component also defining an hinge hook segment extending integrally from the rod spacing segment, the rod second longitudinal end being pivotally attached to the hinge hook segment by a rod second hinge pin.

Conveniently, the actuating rod defines a rod angled segment adjacent the actuating rod first longitudinal end, the rod angled segment extending at an angle relative to the actuating rod longitudinal axis, the rod angled segment being configured and sized so as to create a spacing between the actuating rod and the rake handle when the auxiliary rake head is both in the open and clamping configurations.

In accordance with the present invention, there is also provided an adapter for retro-fittingly providing grasping features to a conventional rake, the conventional rake including an elongated and tubular rake handle, the rake handle defining a handle first longitudinal end and an opposed handle second longitudinal end; a main rake head attached to the rake handle adjacent the handle first longitudinal end by a main head base component, the main rake head including a set of main tines extending from the main head base component, each of the main tines defining a corresponding main tine proximal end and a main tine distal end; a main stabilizing structure extending transversally across the main tines intermediate the main tine proximal and distal ends, the main stabilizing structure including a pair of main stabilizing plates, a stabilized segment of the main tines being sandwiched between the main stabilizing plates; the adapter comprising: an auxiliary rake head pivotally attached to the main rake head by an auxiliary head hinge means, the auxiliary rake head including a set of auxiliary tines extending from the auxiliary head hinge means, each of the auxiliary tines defining a corresponding auxiliary tine proximal end and an opposed auxiliary tine distal end; the auxiliary head hinge means allowing the auxiliary rake head to pivot relative to the main rake head between an open configuration and a clamping configuration in a jaw-like manner, the auxiliary head hinge means being positioned intermediate the main tine proximal ends and the main tine distal ends and the auxiliary tines being sized such that when the auxiliary head is in the clamping configuration the auxiliary tine distal ends are in a proximal relationship with the main tine distal ends; an actuating means for allowing an intended user to move the auxiliary rake head between the open and clamping configurations, the actuating means including an actuating sleeve slidably mounted on the rake handle and an actuating rod, the actuating sleeve defining a sleeve longitudinal axis, the actuating rod defining an actuating rod first longitudinal end, an actuating rod second longitudinal end and an actuating rod longitudinal axis, the actuating rod first longitudinal end being pivotally attached to the actuating sleeve and the actuating rod second longitudinal end being pivotally attached to the auxiliary head by an actuating rod-to-auxiliary head attachment means; a biasing means for biasing the auxiliary rake head towards the open configuration, the biasing means including a resiliently deformable biasing sleeve mounted on the rake handle, the biasing sleeve defining a biasing sleeve first longitudinal end and a biasing sleeve second longitudinal end, the biasing sleeve being sized such that when the auxiliary rake head is moved towards the clamping configuration the biasing sleeve first longitudinal end abuttingly contacts the actuating sleeve and the biasing sleeve second longitudinal end abuttingly contacts the main head base component; whereby slidable movement of the actuating sleeve towards the main head base component resiliently compresses the biasing sleeve, when in a compressed state the biasing sleeve having an inherent tendency to resiliently spring back towards its uncompressed state biases the actuating sleeve away from the main head base component and, through the mechanical link created by the actuating rod, biases the auxiliary rake head towards the open configuration. Conveniently, the biasing sleeve includes an helicoidal-type spring, the helicoidal-type spring being coiled around the rake handle.

Preferably, the auxiliary hinge means includes a first hinge plate and a second hinge plate positioned transversally relative to the main and auxiliary rake heads, the first and second hinge plates each having a corresponding set of spaced apart first and second hinge plate eyelets extending from one of their respective peripheral edges, the first and second hinge plate eyelets being positioned in side by side relationship relative to each other so as to define a common eyelet channel, an hinge rod extending through the eyelet channel to pivotally join together the first and second hinge plates; the first hinge plate being attached to one of the stabilizing plates and the second hinge plate being attached to the auxiliary tines by an auxiliary tine attachment component.

Conveniently, the auxiliary tine attachment component extends transversally across the auxiliary tines adjacent the auxiliary tine proximal ends, the auxiliary tine attachment component including a pair of auxiliary attachment plates, an attached segment of the auxiliary tines being sandwiched between the auxiliary attachment plates.

Preferably, the actuating sleeve includes a rod-to-sleeve attachment section, the rod-to-sleeve attachment section including a sleeve spacing segment extending radially away from the actuating sleeve in a generally perpendicular relationship relative to the sleeve longitudinal axis, the rod first longitudinal end being pivotally attached to the sleeve spacing segment by a rod first hinge pin.

Conveniently, the actuating rod-to-auxiliary head attachment means includes an actuating rod-to-auxiliary head attachment component, the actuating rod-to-auxiliary head attachment component defining a rod spacing segment extending away from the auxiliary attachment plates and in a direction generally parallel to the auxiliary tines, the actuating rod-to-auxiliary head attachment component also defining an hinge hook segment extending integrally from the rod spacing segment, the rod second longitudinal end being pivotally attached to the hinge hook segment by a rod second hinge pin.

Preferably, the actuating rod defines a rod angled segment adjacent the actuating rod first longitudinal end, the rod angled segment extending at an angle relative to the actuating rod longitudinal axis, the rod angled segment being configured and sized so as to create a spacing between the actuating rod and the rake handle when the auxiliary rake head is both in the open and clamping configurations.

BRIEF DESCRIPTION OF THE DRAWINGS

An embodiment of the present invention will now be disclosed, by way of example, in reference to the following drawings in which:

FIG. 1: in a perspective view with sections taken out, illustrates a rake having grasping features in accordance with an embodiment of the present invention with its auxiliary head in an opened configuration.

FIG. 2: in a side view with sections taken out, illustrates the rake shown in FIG. 1.

FIG. 3: in a side view with sections taken out, illustrates the rake shown in FIGS. 1 and 2 with its auxiliary jaw in a partially closed configuration.

FIG. 4: in a detailed view with partial cross sections and sections taken out, illustrates the connection between the main and auxiliary rake heads both part of the rake shown in FIGS. 1 through 3.

DETAILED DESCRIPTION OF THE INVENTION

Referring to FIG. 1, there is shown a rake 10 having grasping features 10 in accordance with an embodiment of the present invention. The rake 10 includes an elongated and tubular rake handle 12. The rake handle 12 defines a handle first longitudinal end 14 and an opposed handle second longitudinal end 16.

A main rake head 18 is attached to the rake handle 12 adjacent the handle first longitudinal end 14 by a main head base component 20. The main rake head 18 includes a set of main tines 22 extending from the main head base component 20. Each of the main tines 22 define a corresponding main tine proximal end 24 and an opposed main tine distal end 26.

An auxiliary rake head 28 is pivotally attached to the main rake head 18 by an auxiliary head hinge means 30. The auxiliary rake head 28 includes a set of auxiliary tines 32 extending from the auxiliary head hinge means 30. Each of the auxiliary tines 32 defines a corresponding auxiliary tine proximal end 34 and an opposed auxiliary tine distal end 36.

The auxiliary head hinge means 30 allows the auxiliary rake head 28 to pivot relative to the main rake head 18 between an open configuration shown in FIGS. 1 and 2, and a clamping configuration shown in FIG. 3 in a jaw like manner. The auxiliary head hinge means 30 is positioned intermediate and preferably substantially mid-way between the main tine proximal ends 24 and the main tine distal ends 26. Furthermore, the auxiliary tines 32 are configured and sized such that when the auxiliary head 28 is in the clamping configuration, the auxiliary tine distal ends 36 are in a proximal relationship with the main tine distal ends 26 such as shown in FIG. 3.

The rake 10 also includes an actuating means for allowing an intended user to move the auxiliary rake head 28 between the open and clamping configurations. The actuating means includes an actuating sleeve 38 slidably mounted on the rake handle 12. The actuating means also include an actuating rod 40 defining an actuating rod first longitudinal end 42 and an opposed actuating rod second longitudinal end 44.

The actuating rod first longitudinal end 42 is pivotally attached to the actuating sleeve 38 while the actuating rod second longitudinal end 44 is pivotally attached to the auxiliary head 28 by an actuating rod-to-auxiliary head attachment means 46 shown in greater details in FIG. 4.

The rake 10 further includes a biasing means for biasing the auxiliary rake head 28 towards the open configuration. The biasing means includes a resiliently deformable biasing sleeve 48 mounted on the rake handle 12. The biasing sleeve 48 defines a biasing sleeve first longitudinal end 50 and an opposed biasing sleeve second longitudinal end 52. The biasing sleeve 48 is sized such that when the auxiliary rake head 28 is moved towards the clamping configuration shown in FIG. 3. The biasing sleeve first longitudinal end 50 abuttingly contacts the actuating sleeve 38 and the biasing sleeve second longitudinal end 52 abuttingly contacts the main head base component 20.

As shown in FIG. 3, slidable movement of the actuating sleeve 38 towards the main head base component 20 resiliently compresses the biasing sleeve 48. In such a stage, the biasing sleeve 48 having an inherent tendency to resiliently spring back towards its uncompressed state biases the actuating sleeve 38 away from the main head base component 20 and thus through the actuating rod 40 biases the auxiliary rake head 28 towards the open configuration.

In a preferred embodiment of the invention, the biasing sleeve 48 includes an helicoidal-type spring coiled around the rake handle 12. Alternatively, the biasing sleeve 48 could take the form of a tubular sleeve made out of an elastomeric resin or any other suitable forms.

A main stabilizing structure 54 stands transversally across the main tines 22, intermediate the main tine proximal distal ends 24, 26. As shown in greater details in FIG. 4, the main stabilizing structure 54 includes a pair of main stabilizing plates 56. A stabilized segment of the main tines 22 are sandwiched between the main stabilizing plates 56. In a preferred embodiment of the invention, the main stabilizing plates 56 merge integrally with each other above one of their longitudinal peripheral edges and channels 58 are formed in the merging segment to allow through passage of the main tines 22.

The auxiliary hinge means 30 preferably includes a first and a second hinge plate 60, 62 positioned transversally relative to the main and auxiliary rake heads 18, 28. The first and second hinge plates 60, 62 each have a corresponding set of spaced apart first and second hinge plate eyelets 64 (only one of which is shown in cross section in FIG. 4) extending integrally from one of their respective longitudinal peripheral edges.

The first and second hinge plate eyelets 64 are positioned in side-by-side relationship relative to each other so as to define a common eyelet channel as is well known in the art. An hinge rod 66 extends through the eyelet channel so as to pivotally join together the first and second hinge plates 60, 62 about an adjacent longitudinal edge thereof.

The first hinge plate 60 is attached to one of the stabilizing plates 56 while the second hinge plate 62 is attached to the auxiliary tines 32 by an auxiliary tine attachment component 68. The auxiliary tine attachment component 68 extends transversally across the auxiliary tines 32 adjacent the auxiliary tine proximal ends 34. The auxiliary tine attachment component includes a pair of auxiliary attachment plates 70. An attached segment of the auxiliary tines 32 is sandwiched between the auxiliary attachment plates 70 so as to retain the latter.

The actuating sleeve 38 preferably includes a rod-to-sleeve attachment section. The rod-to-sleeve attachment section includes a sleeve spacing segment 72 extending radially away from the actuating sleeve 38 in a generally perpendicular relationship relative to the sleeve longitudinal axis. The rod first longitudinal end 42 is pivotally attached to the sleeve spacing segment 72 by a rod first hinge pin 74.

As shown more specifically in FIG. 4, the actuating rod-to-auxiliary head attachment means includes an actuating rod-to-auxiliary head attachment component. The actuating rod-to-auxiliary head attachment component defines a rod spacing segment 76 extending away from the auxiliary attachment plates 70 in a direction generally parallel to the auxiliary tines 32.

The actuating rod-to-auxiliary head attachment component 78 also defines a hinge hook segment 80 extending integrally from the rod spacing segment 76. The rod second longitudinal end 44 is pivotally attached to the hinge hook segment 80 by a rod second hinge pin 82.

The actuating rod 32 preferably defines a rod angled segment 84 adjacent the actuating rod first longitudinal end 42. The rod angled segment 84 extends at an angle designated by the reference letter "A" in FIG. 3 relative to the actuating rod longitudinal axis 86. The rod angled segment 84 is configured and sized so as to create a spacing 88 between the actuating rod 40 and the rake handle 12 and the auxiliary rake head 32 is both in the open and clamping configurations as shown in FIGS. 2 and 3.

The angled segment 84 thus prevents mechanical interference between the actuating rod 40 and adjacent components during use of the rake. The angled segment 84 also ensures that when the rake 10 is being used with its auxiliary rake head 28 in the opened configuration and with the auxiliary tines 32 raking the ground surface, pressure imparted on the auxiliary tines 32 is adequately zectorially transmitted to the actuating sleeve 38.

The main head base component 20 typically includes a cylindrical base sleeve section 90 configured and sized for fittingly receiving at least a portion of the handle first longitudinal end 14. The portion of the handle first longitudinal end 14 fitted within the base sleeve section 90 is typically secured thereto by a base screw 92 or other suitable means.

The base sleeve section 90 also defines a base abutment edge 94 adapted to be used for abuttingly contacting the biasing sleeve second longitudinal end 52. The main head base component 20 also preferably defines a main tine receiving section 96. The main tine receiving section 96 preferably has a generally flat configuration and extends integrally from a distal end of the sleeve section 90.

Both the main and auxiliary tines 22, 32 preferably extend in a distally diverging configuration defining corresponding fan-like arrays. The main and auxiliary tine distal ends 26, 36 are preferably curved so as to define angled distal segments. The main and auxiliary tine distal ends 26, 36 are further preferably slightly laterally offset with respect to each other so that individual tines of one of said heads are receivable between the tines of the other of said heads when said auxiliary rake head 28 is in its clamping configuration.

As shown more specifically in FIG. 4, the main tines 22 are preferably twisted about their respective longitudinal axis and thus define a twisted segment 98 adapted to increase the overall structural rigidity of the main tines 22. The main rake head 18 is preferably still further provided with a resilient stabilizing component having a generally "V" shaped configuration.

The stabilizing component typically defines a pair of proximally merging and distally diverging stabilizing arms 100. Each stabilizing arm 100 typically has an integral coiled loop section 102 for increasing its resilient and structural characteristics. The stabilizing arms are preferably attached at the proximal end thereof to the main head base component 20 and at a distal end thereof to the main stabilizing structure 54.

In use, the rake 10 is adapted to be used for both raking and picking up the raked components. During the raking operation, the auxiliary jaw head 28 is in its opened configuration shown in FIG. 2. The main and auxiliary tine distal ends 26, 36 being laterally offset relative to each other and longitudinally spaced from each other they provide a double set of tine tips that improve the overall ergonomic efficiency of every raking stroke.

Since the auxiliary tines 32 are attached to the main tines 22, intermediate and preferably midway between the main tine proximal and distal ends 24, 26, the distance between the main and auxiliary distal ends 26, 36 is maintained at a suitable value so as to provide an efficient raking stroke. The biasing sleeve 48 and the configuration of the actuating rod 40 ensures stability of the auxiliary head 28 during the raking stroke.

The specific relative positioning between the main and auxiliary raking heads 18, 28 also allows an intended user to pick-up raked components through an ergonomic set of steps in a continuous motion with the raking stroke. This, in turn, reduces the risk of having the raked articles such as leaves or the like blown away or otherwise dispersed.

The present invention also relates to an adapter that can be easily retro-fitted a conventional rake so as to provide grasping features to the conventional rake. Indeed, the components hereinabove disclosed can easily be retro-fitted to conventional rakes without the need for a special tooling or manual dexterity.

In order to retro-fit the grasping component to a conventional rake an intended user merely needs to slidably mount the biasing sleeve 48 over the rake handle 12 until it abuttingly contacts the main head base component 20. The actuating sleeve 38 is then slid over the handle 12 until it contacts the biasing sleeve 48. The hinge means 30 is easily attached to the main rake head 18 by withholding, gluing or otherwise attaching one of the hinge plates 60 to the generally stabilizing plates 56. A combination of the hinge means 30, the auxiliary head 28 and the actuating rod 40 is easily coupled to the actuating sleeve 38 by using the hinge pin 74 to attach the proximal end 42 of the actuating rod 40 to the spacing segment 72.

The fact that the biasing means for biasing the auxiliary head 28 towards the open configuration mainly uses a biasing sleeve slidably mounted over the rake handle 12 instead of using other types of biasing components reduces the risk of having raked elements such as leaves, grass or the like getting caught in the biasing mechanism and possibly interfering with the latter. The clearance 88 provided between the actuating rod 40 and the rod handle 12 further reduces the risk of having raked elements such as leaves, grass or the like interfering with movement of the auxiliary head 28.

The embodiments of the invention in which an exclusive privilege or property is claimed are defined as follows:

1. A rake having grasping features comprising, in combination:

an elongated and tubular rake handle, said rake handle defining a handle first longitudinal end and an opposed handle second longitudinal end;

a main rake head attached to said rake handle adjacent said handle first longitudinal end by a main head base component, said main rake head including a set of main tines extending from said main head base component, each of said main tines defining a corresponding main tine proximal end and a main tine distal end;

an auxiliary rake head pivotally attached to said main rake head by an auxiliary head hinge means, said auxiliary rake head including a set of auxiliary tines extending from said auxiliary head hinge means, each of said auxiliary tines defining a corresponding auxiliary tine proximal end and an opposed auxiliary tine distal end;

said auxiliary head hinge means allowing said auxiliary rake head to pivot relative to said main rake head between an open configuration and a clamping configuration in a jaw-like manner, said auxiliary head hinge means being positioned intermediate said main tine proximal ends and said main tine distal ends and said auxiliary tines being sized such that when said auxiliary head is in said clamping configuration said auxiliary tine distal ends are in a proximal relationship with said main tine distal ends;

an actuating means for allowing an intended user to move said auxiliary rake head between said open and clamping configurations, said actuating means including an actuating sleeve slidably mounted on said rake handle and an actuating rod, said actuating sleeve defining a sleeve longitudinal axis, said actuating rod defining an actuating rod first longitudinal ends an actuating rod second longitudinal end and an actuating rod longitudinal axis, said actuating rod first longitudinal end being pivotally attached to said actuating sleeve and said actuating rod second longitudinal end being pivotally attached to said auxiliary head by an actuating rod-to-auxiliary head attachment means;

a biasing means for biasing said auxiliary rake head towards said open configuration, said biasing means including a resiliently deformable biasing sleeve mounted on said rake handle, said biasing sleeve defining a biasing sleeve first longitudinal end and a biasing sleeve second longitudinal end, said biasing sleeve being sized such that when said auxiliary rake head is moved towards said clamping configuration said biasing sleeve first longitudinal end abuttingly contacts said actuating sleeve and said biasing sleeve second longitudinal end abuttingly contacts said main head base component;

whereby slidable movement of said actuating sleeve towards said main head base component resiliently compresses said biasing sleeve, when in a compressed state said biasing sleeve having an inherent tendency to resiliently spring back towards its uncompressed state biases said actuating sleeve away from said main head base component and, through the mechanical link created by said actuating rod, biases said auxiliary rake head towards said open configuration.

2. A rake having grasping features as recited in claim 1 wherein said biasing sleeve includes a helicoidal-type spring, said helicoidal-type spring being coiled around said rake handle.

3. A rake having grasping features as recited in claim 1 wherein a main stabilizing structure extends transversally across said main tines intermediate said main tine proximal and distal ends, said main stabilizing structure including a pair of main stabilizing plates, a stabilized segment of said main tines being sandwiched between said main stabilizing plates;

said auxiliary hinge means includes a first hinge plate and a second hinge plate positioned transversally relative to said main and auxiliary rake heads, said first and second hinge plates each having a corresponding set of spaced apart first and second hinge plate eyelets extending from one of their respective peripheral edges, said first and second hinge plate eyelets being positioned in side by side relationship relative to each other so as to define a common eyelet channel, an hinge rod extending through said eyelet channel to pivotally join together said first and second hinge plates;

said first hinge plate being attached to one of said stabilizing plates and said second hinge plate being attached to said auxiliary tines by an auxiliary tine attachment component.

4. A rake having grasping features as recited in claim 3 wherein said auxiliary tine attachment component extends transversally across said auxiliary tines adjacent said auxiliary tine proximal ends, said auxiliary tine attachment component including a pair of auxiliary attachment plates, an attached segment of said auxiliary tines being sandwiched between said auxiliary attachment plates.

5. A rake having grasping features as recited in claim 4 wherein said actuating sleeve includes a rod-to-sleeve attachment section, said rod-to-sleeve attachment section including a sleeve spacing segment extending radially away from said actuating sleeve in generally perpendicular relationship relative to said sleeve longitudinal axis, said rod first longitudinal end being pivotally attached to said sleeve spacing segment by a rod first hinge pin.

6. A rake having grasping features as recited in claim 5 wherein said actuating rod-to-auxiliary head attachment means includes an actuating rod-to-auxiliary head attachment component, said actuating rod-to-auxiliary head attachment component defining a rod spacing segment extending away from said auxiliary attachment plates and in a direction generally parallel to said auxiliary tines, said actuating rod-to-auxiliary head attachment component also defining an hinge hook segment extending integrally from said rod spacing segment, said rod second longitudinal end being pivotally attached to said hinge hook segment by a rod second hinge pin.

7. A rake having grasping features as recited in claim 6 wherein said actuating rod defines a rod angled segment adjacent said actuating rod first longitudinal end, said rod angled segment extending at an angle relative to said actuating rod longitudinal axis, said rod angled segment being configured and sized so as to create a spacing between said actuating rod and said rake handle when said auxiliary rake head is both in said open and clamping configurations.

8. An adapter for retro-fittingly providing grasping features to a conventional rake, said conventional rake including an elongated and tubular rake handle, said rake handle defining a handle first longitudinal end and an opposed handle second longitudinal end; a main rake head attached to said rake handle adjacent said handle first longitudinal end by a main head base component, said main rake head including a set of main tines extending from said main head base component, each of said main tines defining a corresponding main tine proximal end and a main tine distal end; a main stabilizing structure extending transversally across said main tines intermediate said main tine proximal and distal ends, said main stabilizing structure including a pair of main stabilizing plates, a stabilized segment of said main tines being sandwiched between said main stabilizing plates; said adapter comprising:

an auxiliary rake head pivotally attached to said main rake head by an auxiliary head hinge means, said auxiliary rake head including a set of auxiliary tines extending from said auxiliary head hinge means, each of said auxiliary tines defining a corresponding auxiliary tine proximal end and an opposed auxiliary tine distal end; said auxiliary head hinge means allowing said auxiliary rake head to pivot relative to said main rake head between an open configuration and a clamping configuration in a jaw-like manner, said auxiliary head hinge means being positioned intermediate said main tine proximal ends and said main tine distal ends and said auxiliary tines being sized such that when said auxiliary head is in said clamping configuration said auxiliary tine distal ends are in a proximal relationship with said main tine distal ends;

an actuating means for allowing an intended user to move said auxiliary rake head between said open and clamping configurations, said actuating means including an actuating sleeve slidably mounted on said rake handle and an actuating rod, said actuating sleeve defining a sleeve longitudinal axis, said actuating rod defining an actuating rod first longitudinal end, an actuating rod second longitudinal end and an actuating rod longitudinal axis, said actuating rod first longitudinal end being pivotally attached to said actuating sleeve and said actuating rod second longitudinal end being pivotally attached to said auxiliary head by an actuating rod-to-auxiliary head attachment means;

a biasing means for biasing said auxiliary rake head towards said open configuration, said biasing means including a resiliently deformable biasing sleeve mounted on said rake handle, said biasing sleeve defining a biasing sleeve first longitudinal end and a biasing sleeve second longitudinal end, said biasing sleeve being sized such that when said auxiliary rake head is moved towards said clamping configuration said biasing sleeve first longitudinal end abuttingly contacts said actuating sleeve and said biasing sleeve second longitudinal end abuttingly contacts said main head base component;

whereby slidable movement of said actuating sleeve towards said main head base component resiliently compresses said biasing sleeve, when in a compressed state said biasing sleeve having an inherent tendency to resiliently spring back towards its uncompressed state biases said actuating sleeve away from said main head base component and, through the mechanical link created by said actuating rod, biases said auxiliary rake head towards said open configuration.

9. An adaptor as recited in claim 8 wherein said biasing sleeve includes a helicoidal-type spring, said helicoidal-type spring being coiled around said rake handle.

10. An adaptor as recited in claim 9 wherein
said auxiliary hinge means includes a first hinge plate and a second hinge plate positioned transversally relative to said main and auxiliary rake beads, said first and second hinge plates each having a corresponding set of spaced apart first and second hinge plate eyelets extending from one of their respective peripheral edges, said first and second hinge plate eyelets being positioned in side by side relationship relative to each other so as to define a common eyelet channel, an hinge rod extending through said eyelet channel to pivotally join together said first and second hinge plates;
said first hinge plate being attached to one of said stabilizing plates and said second hinge plate being attached to said auxiliary tines by an auxiliary tine attachment component.

11. An adaptor as recited in claim 10 wherein said auxiliary tine attachment component extends transversally across said auxiliary tines adjacent said auxiliary tine proximal ends, said auxiliary tine attachment component including a pair of auxiliary attachment plates, an attached segment of said auxiliary tines being sandwiched between said auxiliary attachment plates.

12. An adaptor as recited in claim 11 wherein said actuating sleeve includes a rod-to-sleeve attachment section, said rod-to-sleeve attachment section including a sleeve spacing segment extending radially away from said actuating sleeve in a generally perpendicular relationship relative to said sleeve longitudinal axis, said rod first longitudinal end being pivotally attached to said sleeve spacing segment by a rod first hinge pin.

13. An adaptor as recited in claim 12 wherein said actuating rod-to-auxiliary head attachment means includes an actuating rod-to-auxiliary head attachment component, said actuating rod-to-auxiliary head attachment component defining a rod spacing segment extending away from said auxiliary attachment plates and in a direction generally parallel to said auxiliary tines, said actuating rod-to-auxiliary head attachment component also defining an hinge hook segment extending integrally from said rod spacing segment, said rod second longitudinal end being pivotally attached to said hinge hook segment by a rod second hinge pin.

14. An adaptor as recited in claim 13 wherein said actuating rod defines a rod angled segment adjacent said actuating rod first longitudinal end, said rod angled segment extending at an angle relative to said actuating rod longitudinal axis, said rod angled segment being configured and sized so as to create a spacing between said actuating rod and said rake handle when said auxiliary rake head is both in said open and clamping configurations.

* * * * *